UNITED STATES PATENT OFFICE.

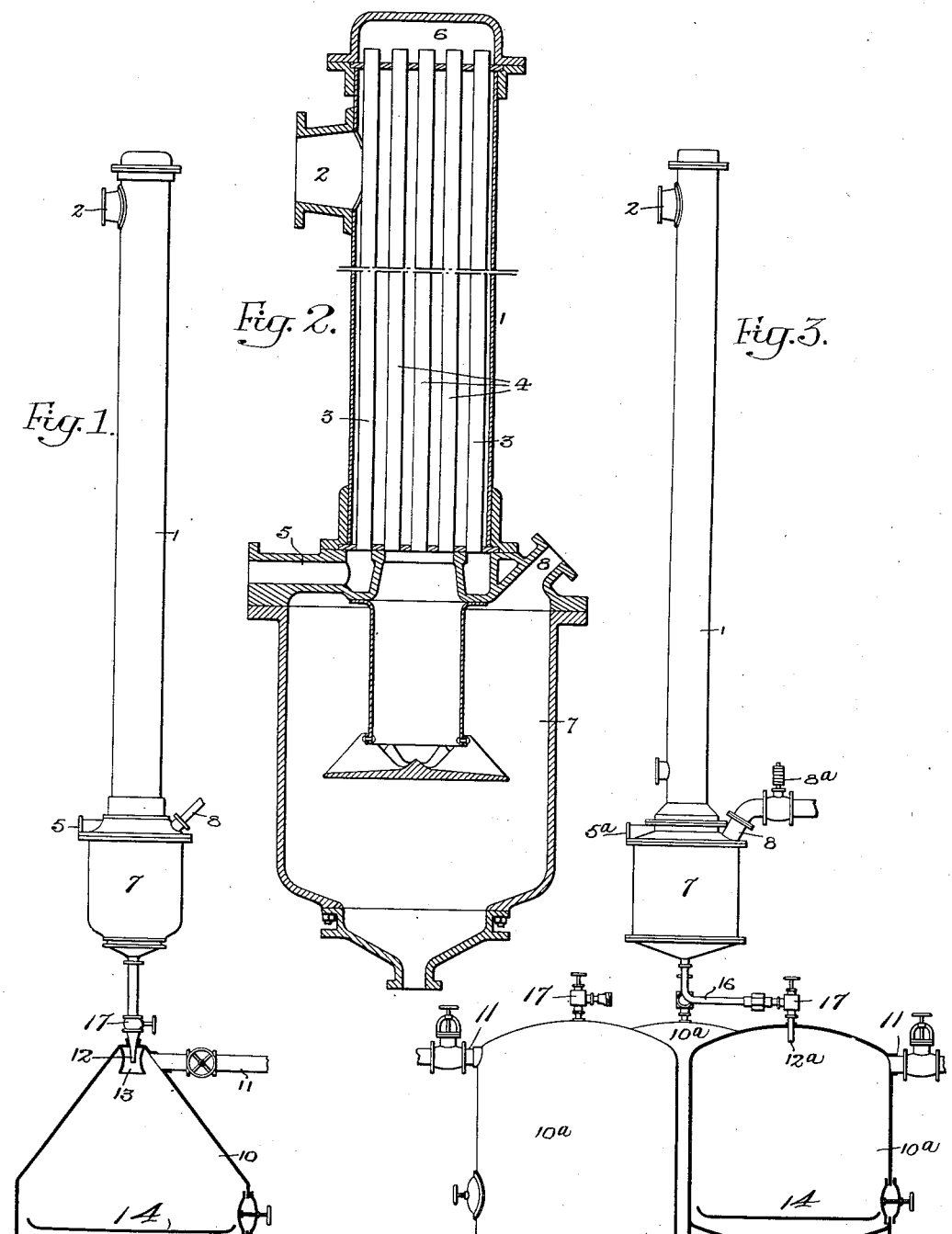

PAUL KESTNER, OF LILLE, FRANCE.

PROCESS OF PREPARING DESICCATED VEGETABLE EXTRACTS.

1,005,554.  Specification of Letters Patent.  Patented Oct. 10, 1911.

Application filed April 19, 1909. Serial No. 490,804.

*To all whom it may concern:*

Be it known that I, PAUL KESTNER, a citizen of the Republic of France, and a resident of Lille, Department of the Nord, France, have invented certain Improvements in Processes of Preparing Desiccated Vegetable Extracts, of which the following is a specification.

This invention relates to desiccated vegetable extracts and processes of preparing same; and it comprises a method of preparing a dry, light and fluffy product from gummy and viscous vegetable extracts, wherein such an extract is concentrated to a relatively thick consistency, and is then temporarily heated to a relatively high temperature; and in order to secure the fluffy product it is allowed to expand into a vacuum chamber; and it also comprises the product of such process; all as more fully herein set forth and as claimed.

Many vegetable extracts, such as those obtained from the common dyestuffs, such as logwood, fustic (both young and old fustic), the tannic extracts, quebracho extract, licorice, medicinal extracts, fruit juices, such as grape juice, etc., prepared with water, alcohol and other extractive means are gummy and viscous when concentrated and are difficult to prepare in the commercially desirable form of dry powders, indefinitely permanent and easily dispensed and handled. As they occur in the markets, these extracts, when in concentrated form, are generally hard, tarry or asphalt-like masses which are not readily handled. Many attempts have been made in the past to prepare desiccated products from these extracts without chemically changing their character, and without adding foreign matter, but these attempts have not been particularly successful. Logwood extract manufacturers, as a matter of fact, have been forced to add such potent chemicals as nitrites to their prepartion to enable them to produce a dry powder on evaporation. The nitrites, of course, change the bodies contained in the extract somewhat, but the convenience of the dry powder form outweighs the disadvantage of this change. In other methods, various inert foreign bodies are mixed with and dilute the extract.

If extracts, such as wood extracts for example, be concentrated to very high densities, it is possible to dehydrate them to such a point that while they remain fluid when hot, they solidify when simply cooled. It is necessary in this case, therefore, to make the final concentration either in the open air or at a temperature of about 100° C., and generally above 100° C., in order to have a sufficient temperature to obtain this degree of concentration. In the solid state, in which condition the extracts appear when cooled they are not generally easy to use and as they are usually resinous or gummy, they are difficult to grind and reduce to powder, for they choke the mills. I have found that by taking these extracts and submitting them while at as high a temperature as possible to the influence of vacuum, I immediately obtain solids, but in a spongy form which I believe to be absolutely new. On passing into the vacuum, a small proportion of the remaining water passes off through self-evaporation. This proportion (usually from 2 to 5%) varies according to the temperature to which the extract has been heated; and the steam yielded not being able to free itself easily, aerates the mass, which hardens while cooling to the temperature corresponding to the vacuum. An extract thus cooled presents a porous or spongy form. It is crisp and easy to reduce to powder between the fingers. Taking logwood extract as typical of these extracts for the present purposes, it is difficult to evaporate it in vacuum evaporators so that it will contain less than 50 per cent. of water. A vacuum evaporator necessarily operates under low temperatures and at these temperatures a concentrated logwood extract containing, say 50 percent of water is a thick viscous mass which will not circulate in the ordinary types of evaporating apparatus and cannot easily be evaporated further therein. Further evaporation of the thick mass in bulk, as in using ordinary vacuum pans, is practically impossible. For further desiccation, it is, therefore, necessary to use drying apparatus which is expensive and complicated, and which does not give satisfactory results for this purpose. It is always supposed that with extracts of this character it is dangerous to use any but a relatively low temperature in evaporation. This, however, is an error. Such extracts may be safely heated to a much higher temperature, even to a number of degrees above 100° C., if this high heating be only temporary. Generally, the high heat should not last more than a couple of minutes. A temporary application of the high temperature is not dangerous. In the present invention, I have devised a cheap, simple and ready method of preparing dry extracts of advantageous properties based on this fact.

I preliminarily evaporate the extract in vacuum evaporators or the like until it attains a sirupy consistency say, with 30 to 50 per cent. of water, the exact amount, of course, depending upon the particular extract treated and its behavior on evaporation. The evaporation should be carried as far as is easily practicable. This preliminary evaporation may be done in the ordinary multiple effect apparatus, or in any other suitable evaporator working under ordinary or minus pressure. The concentrated thick liquid thus prepared is next exposed to heat and evaporation at a relatively high temperature, preferably under some pressure above atmospheric pressure. This heating should be as quick as possible. At temperatures around 100° C., these thick extracts become sufficiently fluid to permit circulation in the evaporating apparatus, and under these conditions evaporation to 8 or 10 percent of water may be effected. While this heating and evaporation may be effected in mass or bulk, this is difficult without special apparatus and I prefer apparatus using some type of film evaporation, and I particularly prefer what is known as the "Kestner type". This film evaporator preferably works under some degree of pressure and at a relatively high temperature.

After the reduction to the desired per cent. of water, with a water extract, is obtained, the hot material in the present embodiment of my invention is transferred to a vacuum chamber and allowed to expand therein. Much of the contained water in the heated material will at once flash into vapor when such material enters the vacuum chamber and this vapor will be formed in every portion of the mass, indefinitely expanding it and forming a light, fluffy, vesiculated material, and particularly with extracts containing much colloid matter. Where the material enters the vacuum chamber, as it ordinarily does, through a relatively narrow jet nozzle, the product as collected will usually have the form of spongy vermicular bodies, physically somewhat like the ordinary "Pharaoh's serpent". It may be comminuted to form a very light, fluffy powder, composed of flaky, curvilinear or irregular-surfaced particles, which may be preserved indefinitely and which upon the addition of water will reform the original extract. No foreign substances or chemicals having been added in the operation, the solution thus obtained is substantially the same as the original extract.

The foregoing process is applicable for the treatment of any vegetable extract containing gummy and colloid bodies, such as vegetable extracts employed for dyeing, mordanting, medicine, food, tanning, etc. Besides all wood extracts—chestnut, oak, logwood, quebracho, licorice, etc. I can also treat by this process the wash water of wood pulp obtained by the bisulfite process, which is in fact a vegetable extract. I obtain from this last a dry extract for use, for example, as a binder for coal and mineral ores as a substitute for rosin or pitch. I can treat by the same process organic extracts or secretions such as milk, extract of meat, and a number of other products, and in general, all products which are fluid when hot and solid when cold and which contain at least some percent of water. I may also start with a concentrated product, even of such concentration that it is solid when cold. It must however be capable of liquefaction upon heating, or if not so capable, enough water must be added to make it so. With any such concentrated product there must be a certain amount of water present and capable of self-evaporation upon reduction of pressure to enable such material to be treated by the present process. Such a product may be heated in the open air or under pressure to obtain fluidity and the desired temperature and may then be introduced into the vacuum chamber. The water present and capable of self-evaporation then flashes into vapor and the material expands and becomes vesicular.

While other forms of high temperature evaporators may be employed for the purpose of increasing the density of the liquid or securing a high degree of concentration, I prefer to employ an apparatus of the type illustrated in my application for patent filed May 29, 1906, Serial No. 319,386, in which the liquid material is caused to ascend in the form of films and subsequently descend in the same form under the influence of heat, in a series of tubes contained within a suitable heating shell.

As most organic extracts are sensible to the action of a high temperature if subjected to it for any length of time, I must as far as possible have recourse to an evaporator concentrating very rapidly and in a single circulation, such as the one referred to which is represented in the drawing. Most of the extracts can undergo without alteration a temperature considerably above 100° C., on condition that it does not last more than one or two minutes, as is the case with the apparatus mentioned. The liquid sent to such form of evaporator may be relatively thick and is preferably so in order that the final concentration may be accomplished in a single passage through such form of evaporator. This preliminary thickening may be performed in any common type of vacuum evaporator such as a multiple effect apparatus. In the final evaporator, the liquid is subjected preferably to a high temperature, which may approximate 128° C. Owing to the rapidity with which this operation may be performed in the described type of evaporator, no serious effect results from even such a high temperature with proper care in manipulation; it being possible to evaporate these materials to a thick consistency in ordinary vacuum or multiple effect apparatus, working as usual at progressively lower temperatures as the concentration increases, and then pass the material rapidly through a zone of relatively high temperature whereby the remaining water is brought to the vaporizing point and most of it is volatilized. The passage must be very rapid so that the material is not long exposed to the high temperature. With a proper correlation of time and temperature, the water of the material may be brought to the volatilizing point and most of it vaporized while the material itself is still substantially unaffected. If the superheated material be now transferred to a vacuum chamber the remaining water which has not been volatilized in the treatment will flash into vapor and cause the mass to become vesicular. If the material be simply transferred to the open air, or if the reduction in pressure be not great the concentrated material will simply cool and solidify.

In the accompanying drawings, I have shown types of apparatus capable of use in carrying out the process forming the subject of my invention, in which:

Figure 1, is a sectional elevation of one form of apparatus having a single vacuum chamber; Fig. 2, is an enlarged view of a portion of the structure shown in Fig. 1, and Fig. 3, is a view somewhat similar to Fig. 1, illustrating a modified form of apparatus in which my improved process may be carried out.

In Figs. 1 and 2, of the accompanying drawings, 1 represents the heating shell of a high temperature evaporator which may be supplied with steam through inlet 2. Within this shell are a series of tubes 3 and 4, the tubes 3 communicating with a feed chamber into which the partially concentrated liquid is fed at 5. Under the influence of heat, such liquid film-coats the tube 3, rises therein and is discharged into an upper chamber 6, accompanied by a relatively large volume of vapor. The vapor so discharged passes through the tubes 4 in which the partially concentrated material descends, insuring an even distribution of the same in films therein, whereby a high degree of concentration may be attained. At the lower part of the structure, a separating chamber 7 is provided whereby the vapor and accompanying liquid may be separated and the vapor may be conducted through an outlet 8 to any desired place of use.

Below the evaporator I may provide a shell or casing 10 which is connected at 11 to any suitable form of exhaust apparatus whereby a high or nearly complete vacuum may be maintained within said shell or casing. The liquid from the evaporator is discharged through a suitable nozzle 12 into the shell or casing and allowed to expand therein. Much of the contained water flashes into vapor which is drawn off by the exhaust means, while the residual solid material is collected in the form of spongy vermicular bodies, which may be subsequently comminuted to form a light fluffy powder, capable of indefinite preservation under proper conditions and of reforming the original extract upon the addition of water. In order that the vacuum-producing means may have no tendency to withdraw the material by entrainment, the inflowing material is preferably discharged into the casing through an element 13 which serves as a deflector and is disposed in such position that the liquid issuing therefrom is below the line of the suction outlet. As moisture is liable to collect on the inner walls of the shell or casing 10 in which desiccation takes place, which if allowed to come in contact with the material within such chamber would destroy its value as a dry product, I preferably arrange in the bottom of the chamber a pan 14 to receive the desiccated material; which pan is supported above the bottom of the shell or casing. Any moisture collecting on the walls of said casing therefore may pass to the bottom of the same out of contact with the desiccated material and may be discharged through a valved outlet 15. The extract on entering the chamber within the shell or casing 10 is increased considerably in volume, and is cooled suddenly to a temperature dependent on the vacuum under which I operate. This increase in volume is due to the self-evaporation of a small part of the water remaining in the concentrated extract. As the water cannot free itself because of the gummy nature of the extracts, it aerates the mass, which generally assumes the appearance of a worm with a diameter considerably larger than the diameter of a pipe or of the spout through which it entered. This worm which forms thus continuously falls to the bottom of the chamber.

In the form of apparatus shown in Fig. 3, 1 represents the heating shell receiving steam at 2, in the same manner as the structure illustrated in Fig. 1. The internal arrangement of this form of the apparatus is the same as illustrated in Fig. 2, and the steam produced within the evaporator from the liquid undergoing treatment may escape through a relief valve 8ª connected to the outlet 8, by which I can obtain the desired back pressure if I wish to make the evaporation at a pressure above that of the atmosphere. In this form of apparatus, the extract to be concentrated is fed at 5ª, and the finished extract is discharged through a curved outlet pipe 16, which may be coupled to a nozzle 12ª leading to the vacuum chamber within the shell or casing 10ª.

In the form of apparatus shown in Fig. 1, connection is made directly to the chamber in which desiccation takes place, and as in the use of such form of apparatus the output would be relatively limited, I may, therefore, provide an apparatus such as shown in Fig. 3, in which a series of desiccation chambers are provided, having nozzles 12ª to each of which the curved outlet pipe 16 may be directed as the chambers are successively emptied. By employing a series of vacuum chambers as in Fig. 3, it is possible to have a continuous performance of the apparatus.

In the apparatus shown in the drawings, the concentrated extract enters the chamber by a single opening controlled by a valve 17. I can of course vary the size of the inlet by the number of openings used, and I may obtain a corresponding number of worms, whose diameters will decrease as I increase the number of openings. The density of this matter is extremely light. It is so light that I can, as stated above, reduce it to a powder very easily by crushing it between the fingers. This powder as well as the uncrushed product dissolves very easily.

While other materials than gummy and viscous vegetable extracts may be treated by the described process with advantage, such as milk, acetate of lime, tar, etc., yet I regard the invention in its present preferred embodiment as particularly adapted to such vegetable extracts. The described operation may also be performed at somewhat lower temperatures, though in some instances less advantageously. The question of temperature, however, is a relative one and depends entirely upon the materials treated. Assuming therefore that the material may safely stand a higher temperature it will be understood that a concentrated liquid of, say 100° C. temperature, may be projected into a vacuum chamber with a production of the same result though of course in a less degree than if projected at a higher temperature and pressure. The hotter the liquid or material entering the vacuum chamber, the greater will be the fluffing or desiccation produced, and it is therefore, usually advantageous to introduce the material at a temperature somewhat above 100° C, and as close as possible to the critical temperature.

I claim:

1. The process of drying gummy and viscous extracts which comprises evaporating such extracts to a thick consistency, momentarily raising the temperature of the thickened extract to a point higher than the temperature at which it was evaporated, and then allowing the highly heated extract to expand in a vacuum.

2. The process of drying gummy and viscous vegetable extracts which comprises preliminarily evaporating such extracts to a thick consistency, causing the extract to traverse a highly heated evaporator in rapidly moving films until the major amount of residual liquid is removed, and then allowing the highly heated, highly evaporated material to expand in a vacuum to remove the remaining volatile moisture.

3. The process of drying gummy and viscous vegetable extracts which comprises preliminarily evaporating such extracts to a thick consistency, causing the extract to traverse an evaporator heated above 100° C. in rapidly moving films until the major amount of residual liquid is removed, and then allowing the highly heated, highly evaporated material to expand in a vacuum to remove the remaining volatile material.

4. A method of producing a dry extract which consists in finishing the concentration of a partially concentrated extract at a temperature above 100° C. and carrying the concentration to such an extent that if cooled the extract would become solid, and then discharging the hot extract thus obtained in fluid state into a vacuum whereby, if concentration has been carried high enough, a substantially solid, dry and porous extract is obtained.

5. A method of producing dry extracts consisting in heating to a temperature above 100° C., a concentrated extract containing at least enough water to be in a liquid state, and then allowing this superheated liquid to suddenly expand in a vacuum.

6. The process of drying gummy and viscous vegetable extracts, which comprises subjecting such extracts to an evaporating heat, the final stages of such heating being performed under pressure greater than atmospheric and at a temperature above 100° C., and the evaporation being carried sufficiently far to cause the extract to be dry at atmospheric temperature.

7. The process of drying gummy and viscous vegetable extracts, which comprises subjecting such extracts to an evaporating heat, the final stages of such heating being performed under pressure greater than atmospheric and at a temperature above 100° C., and the evaporation being carried sufficiently far to cause the extract to be dry at atmospheric temperature, said pressure being released prior to the completion of the evaporation whereby vapor flashes into existence throughout the mass of material under treatment.

In testimony whereof, I have signed my name to this specification, in the presence of two subscribing witnesses.

PAUL KESTNER.

Witnesses:
 HENRI CHARRIER,
 LÉON PECKEL.